United States Patent [19]

Tomlinson

[11] 4,038,013
[45] July 26, 1977

[54] SPINNERET APPARATUS WITH PARTICULATE MATERIAL CONVEYING MEANS

[75] Inventor: Ian Tomlinson, Rossendale, England

[73] Assignee: Ernest Scragg & Sons Limited, Macclesfield, England

[21] Appl. No.: 672,432

[22] Filed: Mar. 31, 1976

[30] Foreign Application Priority Data

Apr. 29, 1975   United Kingdom ............... 17818/75

[51] Int. Cl.² .............................................. D01D 5/02
[52] U.S. Cl. .................................. 425/378 S; 198/658; 425/447
[58] Field of Search ............... 425/200, 207, 208, 209, 425/378 S, 382.2, 447; 259/7, 8; 126/343.5 A; 198/658, 724, 778

[56] References Cited

U.S. PATENT DOCUMENTS 2,810,159  10/1957  Teichmann .................... 425/207 X
3,753,661  8/1973  Simons ..................... 126/343.5 A X

FOREIGN PATENT DOCUMENTS 2,044,364  7/1971  Germany ............................. 425/207

Primary Examiner—Robert D. Baldwin
Attorney, Agent, or Firm—Michael J. Striker

[57] ABSTRACT

Apparatus is disclosed for extruding filaments from synthetic polymeric particulate material which is conveyed to the melting area by means including a cylindrical barrel having an internal wall provided with a screw thread, and a rotating member mounted within the barrel being of a polygonal cross-section having a transverse dimension closely approximate to the inner diameter of the screw flights of the screw thread so as to allow movement of the material in a direction of the screw axis but to substantially prevent rotation of the material about the axis relative to the rotating member.

11 Claims, 4 Drawing Figures

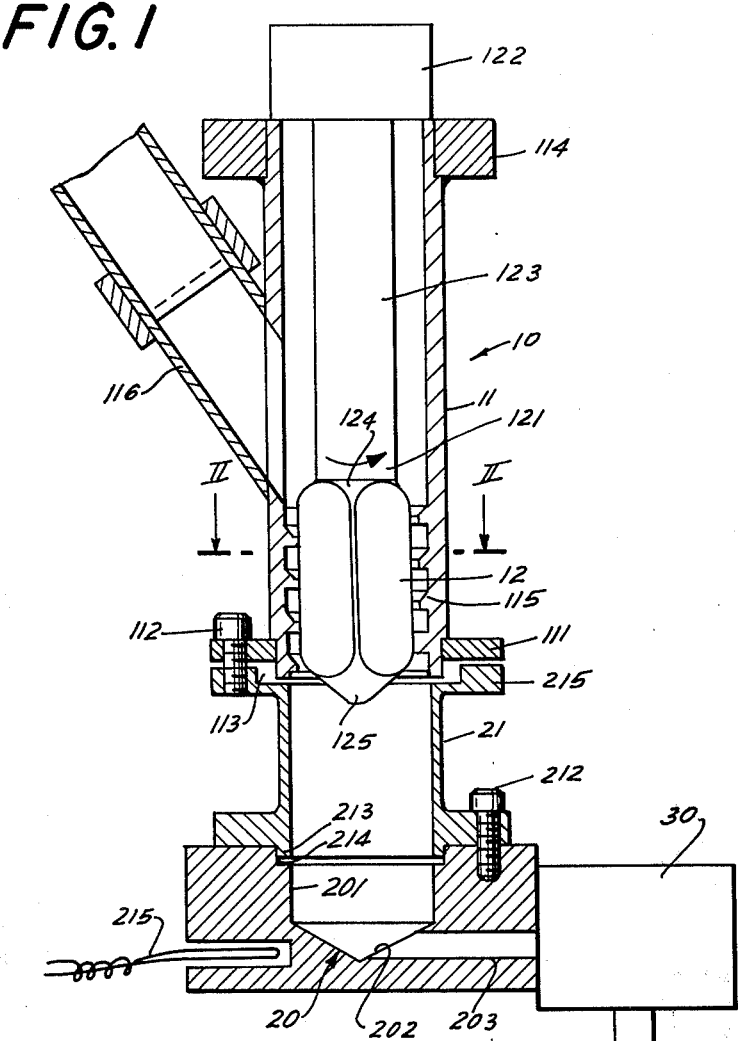
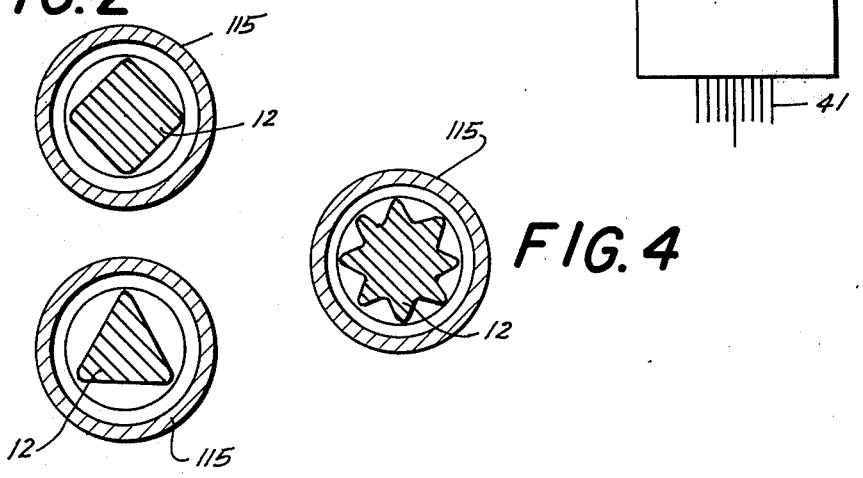

SPINNERET APPARATUS WITH PARTICULATE MATERIAL CONVEYING MEANS

This invention relates to apparatus for conveying particulate material and is particularly, though not exclusively, concerned with the conveyance of particulate material in extruders for melt spinning artificial textile filaments.

In the prior British patent specification No. 1,386,406 there is disclosed a melt spinning apparatus for melt spinning one or more filaments from a synthetic polymer, comprising a hollow barrel having an elongate interior, feed means at one end of the barrel for feeding particulate polymer into the interior of the barrel, polymer melting means at the other end of the barrel for producing a melt from the particulate polymer, a rotatable feed screw mounted within the barrel with a radial gap between the feed screw and the barrel for moving the particulate polymer along the barrel from the feed means to the polymer melting means, the interior of the barrel having a non-circular transverse cross-section which remains constant throughout the length of the barrel for preventing rotation of the particulate polymer with the feed screw whereby the particulate polymer in the barrel moves from the feed means to the polymer melting means substantially only along an axial path, a spinneret and means for communicating polymer from the polymer melting means to the spinneret for producing at least one filament.

In the preferred embodiment of the above apparatus, the interior of the barrel is square. This necessitates forming the melt area similarly square so as to receive satisfactorily the compressed polymer from the barrel. However, manufacture of the square barrel and of the square melt area is complex and extremely expensive.

It is a primary object of the invention to provide an apparatus for conveying particulate material which retains at least some of the advantages of the prior arrangement while simplifying construction of the apparatus.

The present invention, according to a first aspect, provides an apparatus for conveying particulate material, comprising a cylindrical barrel having a screw thread on the interior thereof, means for feeding the material to the barrel, a member mounted within the barrel so as to extend along at least part of the axial length of the screw thread, the member having a shape which allows movement of the material along the axis and which substantially prevents rotation of the material about the said axis relative to the member, and means for causing relative rotation of the member and the barrel whereby to cause relative rotation of the material and the barrel to advance the material along the barrel.

According to a second aspect of the invention, there is provided an apparatus or extruding one or more filaments from synthetic polymeric particulate material comprising apparatus for conveying said material according to the first aspect of the invention, melting means for receiving from the barrel and melting the material and a spinneret for spinning one or more filaments from the melted material.

The transverse cross-section of the member is preferably square but any alternative cross-section which prevents or inhibits rotation of the material relative to the member is acceptable. Particularly, triangular or other polygonal cross-section is suitable, as is a member having radial fins or lobes for engaging and rotating the material.

In a preferred embodiment, the member is drivingly rotatable about the axis of the barrel which is held stationary.

The invention will become more apparent from the following description of one embodiment thereof when taken in conjunction with the accompanying drawings, wherein:

FIG. 1 is a part sectional front elevation of a melt spinning apparatus incorporating a material conveying apparatus according to the present invention;

FIG. 2 is a section along the lines II—II of FIG. 1 showing a member mounted within a barrel and having a square cross-section;

FIG. 3 is a section along the lines II—II of FIG. 1, showing the member having triangular cross-section; and FIG. 4 is a section along the lines II—II of FIG. 1, showing the member of radially finned cross-section.

The melt spinning apparatus as shown in FIG. 1, comprises a polymer feeding apparatus 10, a polymer melting area 20 from which melted polymer is withdrawn via a metering pump 30 to a spinneret 40 for extrusion as one or more filaments 41. The metering pump 30 and the spinneret 40 are shown schematically only since their construction is of conventional form and will be within the skill of one in the art.

The polymer melting grid 20 comprises a metal block having formed therein a circular bore 201 for receiving compressed polymer, the bore 201 terminating in a conical portion 202 from which a channel 203 leads to the metering pump 30. Heating elements 215 and a thermostat (not shown) are embedded within the block to controlledly heat the block to a temperature for melting the compressed polymer.

A heat insulation and connecting member 21 is mounted on the block by a flange 211 and bolts 212 trapping a gasket 214 between a depending flange 213 thereof and the block. The member 21 is of circular cross-section of the same diameter as the bore 201. The member 21 is formed of thin metal so as to inhibit the transmission of heat from the polymer melting block to polymer waiting upstream.

The polymer feeding apparatus 10 comprises an elongate barrel 11 of the same internal diameter as the member 21 and is secured to the member 21 by the connection of co-extensive flanges 111 and 215 by bolts 112. A gasket 113 is trapped between the flanges to assist in heat insulation and to prevent the escape of compressed polymer. The barrel 11 is fixedly mounted on a frame 114 to prevent rotation, and carries upstanding from the interior surface thereof at the end adjacent the portion 21, a buttress screw thread 115 comprising a single start left hand thread of $8\pi$ angle of revolution terminating substantially at the junction between the barrel 11 and the member 21. The pitch of the thread ½ inch with flights of ⅛ inch across and ⅛ inch high. The flights present a surface lying in a radial plane for reaction against the face of the material and the opposing surface is cut away to provide greater space for the receipt of material.

An inlet connection 116 communicates with the side of the barrel 11 so as to feed under gravity particulate polymeric material from a supply (not shown) to the interior of the barrel above the screw thread 115.

A member 12 is mounted coaxially within the barrel 11 and is connected by a shoulder 124 to a driving shaft 123 which is mounted on bearings provided at the upper end of the barrel and driven for rotation about the axis of the barrel in the direction of the arrow 121 by a motor, the motor and bearings being indicated schematically at 122. Preferably, the member 12 is of substantially square cross-section so as to prevent or inhibit the rotation relative thereto of adjacent polymeric material and is of constant cross-section whereby to present no restriction to axial motion of the material. The member 12 is substantially co-extensive with the screw thread 115 so as to co-operate therewith, as will be explained in detail hereinafter, for driving the particulate polymeric material, and terminates in a pyramidal shaped end portion 125 which has the sharp edges and points removed. The sides of the end portion 125 co-operate with the sides of the member 21 to control the spread of the material as it moves from the space between the barrel 11 and the member 12 into the member 21.

As shown in FIG. 2, the member 12 is substantially of square cross-section with the corners chamfered. Without chamfering, the corners would extend almost to the innermost edge of the screw thread flights. In one particular example the inner diameter of the flights is 1.5 inches with the sides of the member 12 being 1 inch whereby the diagonal of the member 12 without chamfering would be 1.414 inches or a spacing of 0.043 inch. However, without chamfering, large forces acting upon the member 12 act most heavily upon the corners whereby they are damaged in use, leading to irregularities in the feed rate of the polymer. Thus, with chamfering, weaker areas less able to withstand the forces involved are removed.

In operation, particulate polymeric material is fed through the inlet 116 to the space between the barrel and the drive shaft 123, wherefrom it falls under gravity onto the shoulder 124 to enter the space between the member 12 and the screw thread 115. In this way, on starting the device, the material loosely fills the bore 201 and the member 21. Normally during operation these parts will be filled with the material in a compressed state. Rotation of the member 12 in the direction of the arrow causes similar rotation of the particulate material adjacent the member 12 which will induce rotational motion in all the material around the member. The rotational movement of the material lying between the flights of screw thread 115 will cause the material to move axially, thus inducing similar axial motion in the material adjacent the member 12. As more material is moved axially, the material is compressed to form in equilibrium substantially a solid, with some freedom of movement of the individual particles within the solid. Thus rotation of the member 12 rotates substantially the whole of the material surrounding it, which material is then caused to move axially under the influence of the screw thread 115. Since the cross-section of the member 12 is constant, no restriction is placed on the axial movement under equilibrium of the compressed material between the screw thread 115 and the member 12.

The axial movement of the material compresses and forwardly feeds the material within the member 21 and the melting block bore 201 for melting, wherefrom the melt is fed via the metering pump 30 to the spinneret 40.

While the member 12 is illustrated in the preferred embodiment of square cross-section, it will be appreciated that any alternative shape, which prevents or inhibits rotation of the material relative to the portion, would be acceptable. Thus for example, the member 12 can be of triangular cross-section as shown in FIG. 3, radially finned cross-section as shown in FIG. 4 or any other suitable cross-section having a transverse dimension closely approximate to the inner diameter of the screen flights of the screen thread suitable, as would a member having radially extending fins or lobes for engaging the material.

Since the member 12 carries no screw thread and no other abutment causing restriction to axial motion of the material, little axial force, apart from friction is applied to the member 12 whereupon little axial force is applied to the bearings and motor 122 of the member 21. It is well known that axial forces are particularly damaging to bearings and if strong, are expensive to absorb.

In order to feed the material within the barrel 11, it is important that the rotation of the member 12 be about the axis of the barrel 11 so as to suitably rotate the material relative to the barrel.

For convenience of manufacture, the screw thread may be formed on a separate cylindrical insert for receipt within the barrel.

We claim:

1. An apparatus for conveying particulate material, comprising a cylindrical barrel having an internal wall provided with a screw thread; means for feeding said material into said barrel; a member mounted in said barrel and extending along at least part of the axial length of said screw thread, said member being of a polygonal cross-section having a transverse dimension closely approximate to the inner diameter of the screw flights of said screw thread so as to allow movement of said material in a direction of said axis but to substantially prevent rotation of said material about said axis relative to said member; and means for causing relative rotation of said member and said barrel whereby to cause relative rotation of said material and said barrel to advance the material along said barrel.

2. Apparatus according to claim 1 wherein said member is of constant cross-section over that part extending over the axial length of said screw thread.

3. Apparatus according to claim 1 wherein said cross-section is square.

4. Apparatus according to claim 1 wherein said cross-section is triangular.

5. Apparatus according to claim 1 wherein said cross-section comprises radial fins.

6. Apparatus according to claim 1 comprising means for driving said member in rotation about said axis and means for holding said barrel stationary.

7. Apparatus according to claim 1 wherein said barrel comprises an outer cylindrical portion and an insert portion on which said screw thread is formed.

8. Apparatus according to claim 1 in combination with apparatus for extruding one or more filaments from synthetic polymeric particulate material comprising, melting means for receiving from said barrel and melting said material and a spinneret for spinning one or more filaments from said melted material.

9. Apparatus according to claim 8 comprising heat insulation means situated between said melting means and said barrel to prevent the particulate polymer material melting whilst passing along said barrel.

10. Apparatus according to claim 8 wherein said melting means comprises a block of metal having a bore through which the material passes and having heating elements embedded within said block.

11. Apparatus according to claim 10 wherein said bore is conical, having a maximum diameter equal to the internal diameter of the barrel and tapering in the direction of movement of the material.

* * * * *